(12) United States Patent
Vandergriff

(10) Patent No.: US 10,410,546 B2
(45) Date of Patent: Sep. 10, 2019

(54) CRIME SCENE EVIDENCE MARKING DEVICE

(71) Applicant: Gary Louis Vandergriff, Midland, TX (US)

(72) Inventor: Gary Louis Vandergriff, Midland, TX (US)

( * ) Notice: Subject to any disclaimer, the term of this patent is extended or adjusted under 35 U.S.C. 154(b) by 142 days.

(21) Appl. No.: 15/498,602

(22) Filed: Apr. 27, 2017

(65) Prior Publication Data

US 2018/0315353 A1    Nov. 1, 2018

(51) Int. Cl.
  *G09F 7/14* (2006.01)
  *G01B 3/04* (2006.01)
  *G09F 7/18* (2006.01)

(52) U.S. Cl.
  CPC .............. *G09F 7/14* (2013.01); *G01B 3/04* (2013.01); *G09F 7/18* (2013.01); *G09F 2007/1856* (2013.01); *G09F 2007/1873* (2013.01)

(58) Field of Classification Search
  CPC ...... G09F 7/14; G09F 7/18; G09F 2007/1873; G09F 2007/1856; G01B 3/04
  USPC .................. 33/1 D, 1 G, 483, 484, 490, 491, 33/495–500, 474, 478, 758–760, 768; 403/83, 100–104, 109.1, 109.2, 110, 231; 116/63 C, 63 P
  See application file for complete search history.

(56) References Cited

U.S. PATENT DOCUMENTS

| | | | | |
|---|---|---|---|---|
| 4,466,376 A | * | 8/1984 | Wells | B60Q 7/005 116/63 C |
| 4,483,075 A | * | 11/1984 | Kundin | A61B 5/107 33/512 |
| 4,541,190 A | * | 9/1985 | Weiner | G09F 7/00 40/124.15 |
| 4,772,869 A | * | 9/1988 | Grammas | B60Q 7/00 116/63 C |
| 5,115,343 A | * | 5/1992 | Bennett | G02B 5/124 116/63 C |
| 5,131,164 A | * | 7/1992 | Miller | E04F 21/18 33/427 |
| D359,699 S | * | 6/1995 | Vandergriff | D10/70 |
| 5,551,160 A | * | 9/1996 | Ferris | G06G 1/06 33/452 |
| 5,787,616 A | | 8/1998 | Rogers | |
| 5,915,852 A | * | 6/1999 | Rogers | G09F 1/06 116/209 |
| D411,810 S | * | 7/1999 | Stockman | 116/63 C |
| D431,839 S | * | 10/2000 | McCaffrey, Jr. | D20/10 |

(Continued)

FOREIGN PATENT DOCUMENTS

GB          2456354         7/2009

*Primary Examiner* — Justin Seo
*Assistant Examiner* — Tania C Courson
(74) *Attorney, Agent, or Firm* — Laubscher & Laubscher, P.C.

(57) ABSTRACT

A crime scene evidence marker includes a base with a central portion and a plurality of coplanar legs extending in spaced relation from the central portion. A projection is connected to the central portion of the base. A post is removably connected with the projection. The post extends vertically and has an opening in a lower end which is configured to complement the configuration of the projection. The post lower end receives the projection in a mating configuration to removably connect the post with the base. The legs and post have measuring indicia placed thereon.

7 Claims, 4 Drawing Sheets

(56) References Cited

U.S. PATENT DOCUMENTS

| | | | | |
|---|---|---|---|---|
| 6,243,958 B1 * | 6/2001 | Ringley, Jr. | ......... | G09F 15/0056 |
| | | | | 116/209 |
| 6,349,667 B1 * | 2/2002 | Rogers | ..................... | A63C 9/06 |
| | | | | 116/173 |
| 6,467,179 B1 * | 10/2002 | Wolf | ..................... | B43L 7/027 |
| | | | | 33/465 |
| 6,618,969 B1 * | 9/2003 | Rogers | ..................... | G09F 1/06 |
| | | | | 40/124.16 |
| 6,880,277 B2 * | 4/2005 | Kaminski | .................. | G09F 7/00 |
| | | | | 40/584 |
| 6,935,059 B1 * | 8/2005 | Chang | ...................... | G09F 7/18 |
| | | | | 256/1 |
| 7,228,813 B2 * | 6/2007 | Flamingo | ............ | E01F 9/688 |
| | | | | 116/63 C |
| 7,748,128 B2 * | 7/2010 | Martin | ..................... | G01C 9/18 |
| | | | | 33/365 |
| 8,166,663 B2 * | 5/2012 | Elias | ..................... | B43L 7/027 |
| | | | | 33/429 |
| 8,359,759 B2 * | 1/2013 | Schneider | .................. | B43L 7/00 |
| | | | | 33/483 |
| 8,823,549 B1 * | 9/2014 | Moone | ..................... | G08G 1/01 |
| | | | | 116/63 C |
| 9,689,123 B2 * | 6/2017 | Chi | ......................... | E01F 9/654 |
| 2008/0120859 A1 | 5/2008 | Eversdijk | | |
| 2018/0340764 A1 * | 11/2018 | Lin | .......................... | G01B 3/04 |

* cited by examiner

CRIME SCENE EVIDENCE MARKING DEVICE

BACKGROUND OF THE INVENTION

Crime scene evidence markers are used to assist with measuring, recording, and maintaining records of evidence at a crime scene. These markers have been made of differing shapes and sizes, and with differing measuring and numbering scales. Most of the devices used in the industry are markers made in the shape of a triangle with numbering and measuring indicia placed on them. These markers are typically embossed with a number or letter identifier and then placed next to evidence, at which time a picture is taken to capture the evidence. Investigators or others on the scene can take notes of the evidence and use the identifying number or letter to improve organization of the notes.

In addition to including a number or letter, many crime scene evidence markers include a measuring scale to assist in precision of evidence recordation and analysis. A scale such as the ABFO No. 2 Photomacrographic Scale is known in the art. The scale can be used on the crime scene when taking notes, or it can be used when reviewing images captured on the scene. Crime scene evidence markers have used other useful marking tools such as crosshairs to assist with distortion of evidence in a picture or "caution yellow" coloring to allow the evidence marker to standout more prominently.

BRIEF DESCRIPTION OF THE PRIOR ART

The Hsieh GB Patent No. 2,456,354 and the Rogers U.S. Pat. No. 5,787,616 disclose common markers known in the art. The markers have a pyramid or tent shape and a pitched roof or inverted "v" shape. These markers also demonstrate the use of marker identifiers (i.e. numbers or letters), measuring indicia, the use of directional arrows and crosshairs, and other known crime scene evidence marker features.

Other devices do not include the pitched or tented roof, but can be placed on the ground or on a wall. For instance the Eversdijk US Patent Application Publication No. 2008/0120859 discloses a marker that lays flat on the ground for positioning next to or near crime scene evidence. That marker includes measuring indicia, crosshairs, a directional arrow, and additional evidence marker features.

The above references disclose crime scene evidence markers that incorporate many of the measuring and recordation features known in the art. Those devices, however, have drawbacks in measuring capability and precision, as well as in stability of the marker on the scene and in adverse conditions.

SUMMARY OF THE INVENTION

It is a primary object of the present invention to provide a crime scene evidence marker with improved stability and rigidity over other markers that can better withstand adverse conditions at a crime scene or normal wear and tear.

It is a further primary object of the present invention to provide a crime scene evidence marker that incorporates horizontal and vertical measuring from multiple vantage points and with two measuring scales, preferably inches and centimeters.

In one preferred embodiment, the crime scene evidence marker includes a base with a central portion and a plurality of coplanar legs extending in spaced relation from the central portion. A projection is connected to the central portion of the base, and a post is removably connected to the projection, extending vertically from the projection. The post has an opening in a lower end and has a configuration that complements the configuration of the projection. The post lower end receives the projection in a mating configuration to removably connect the post with the base.

In another embodiment, the projection includes four walls and has a rectangular cross section. The post opening at its lower end also has a rectangular cross section so as to form a mating configuration. It will be apparent to those skilled in the art that the projection and post opening can be formed with different configurations, for instance, a cylinder, pyramid, cube, diamond, hexagon, or other comparable shape so long as the projection and the opening in the lower end of the post are complementary. It is not necessary, however, for the outer configuration of the post to be complementary to either the projection or the lower end opening.

In another embodiment, the walls of the projection define a cavity with an open upper end in which a weight can be placed. The weight adds further stability to the base of the crime scene evidence marker improving its function at the scene of the crime.

The top wall of the vertical projection includes an opening large enough to receive the pole of a flag or a similar object. The flag or other object can be used to aid in viewing the crime scene evidence marker from a distance.

In yet another embodiment, there are four coplanar legs, each of which is arranged at ninety degrees relative to an adjacent leg. Such legs add to the stability of the crime scene evidence marker, and also improve the measuring capabilities by providing scales from four sides and many vantage points.

Preferably, the crime scene evidence marker is formed of a material of at least medium rigidity, such as plastic. It will be apparent to those skilled in the art that other materials with at least medium rigidity could be used, such as wood or metal.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
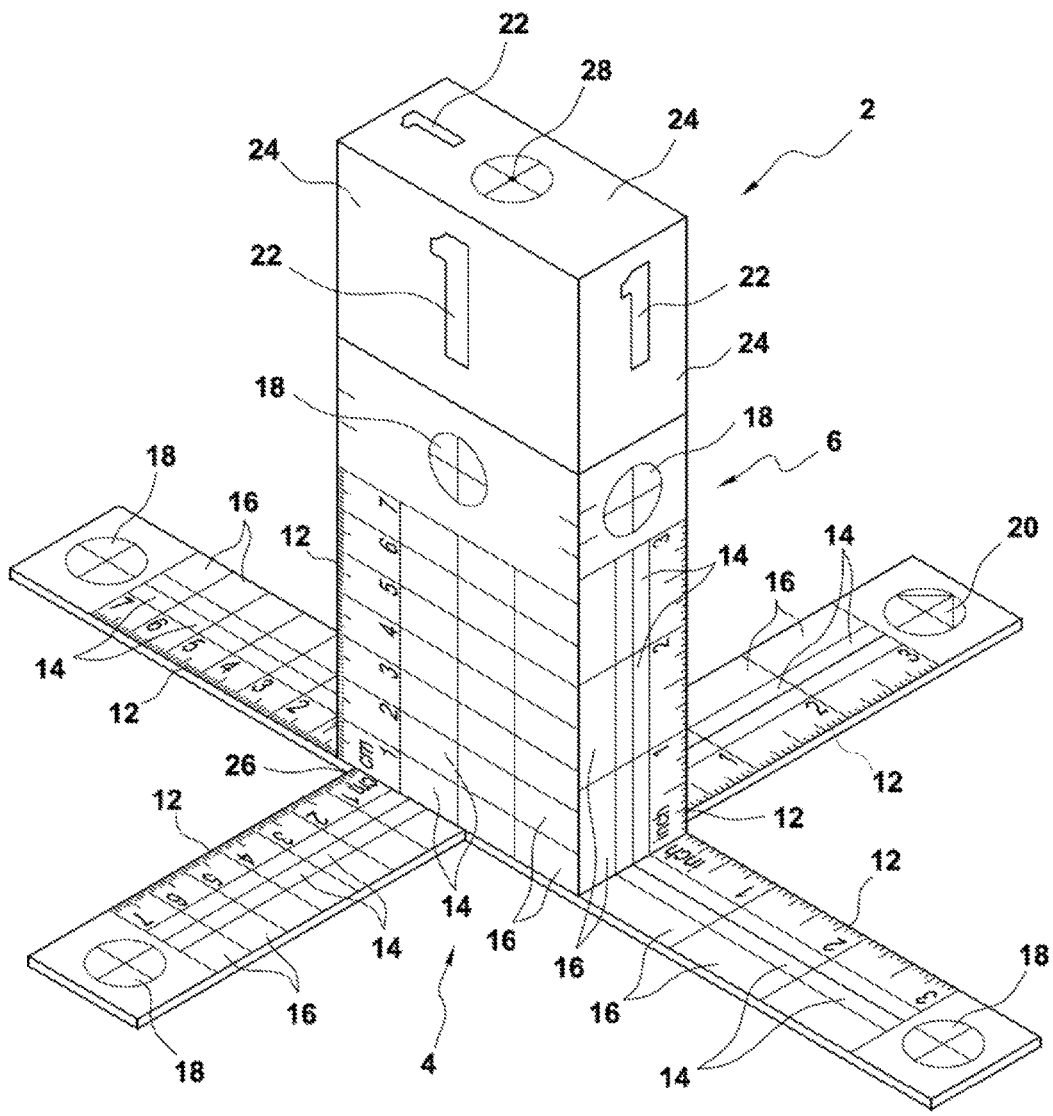
FIG. 1 is a front perspective view of a crime scene evidence marker.
Figure 2:
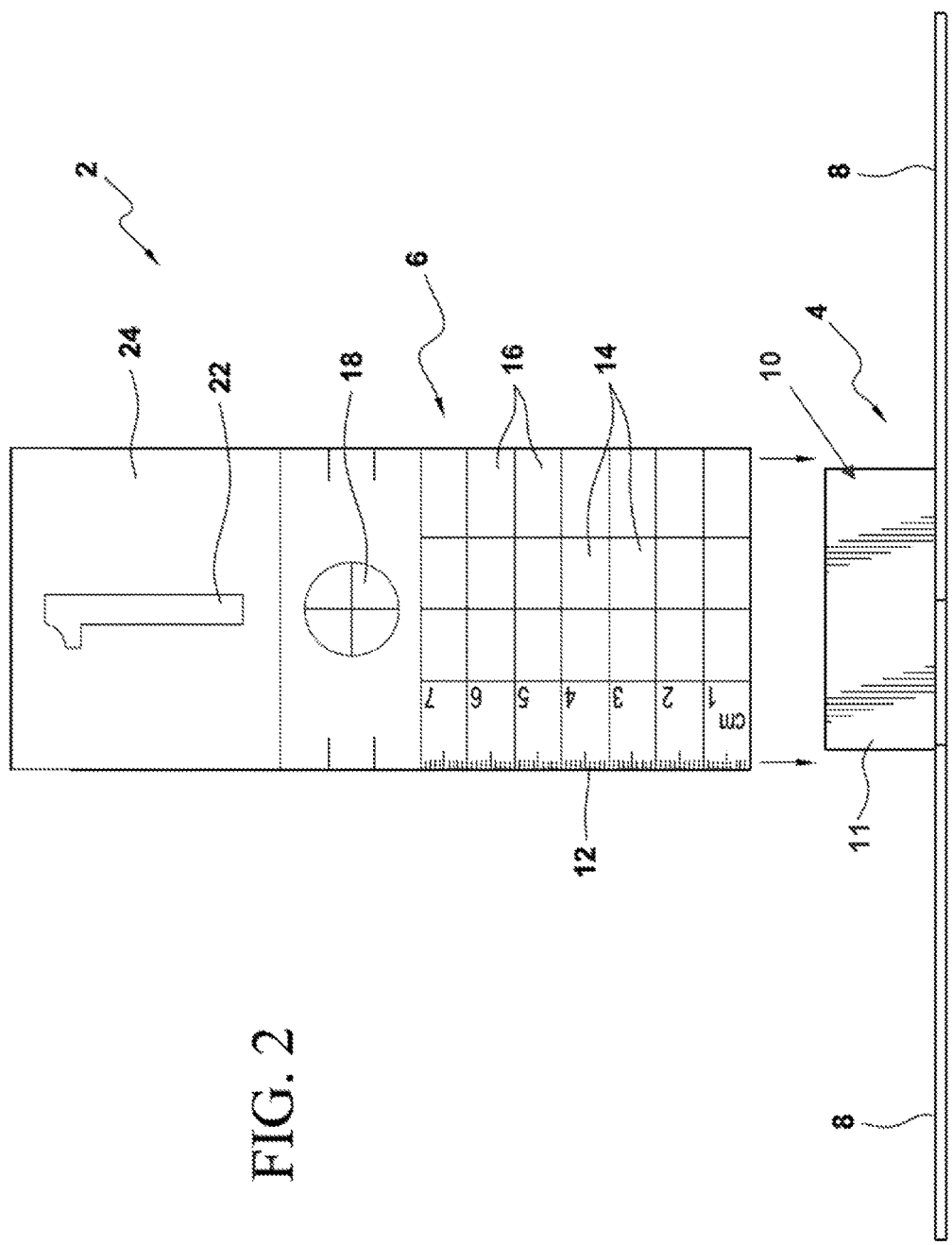
FIG. 2 is a front exploded view of the crime scene evidence marker of FIG. 1.

The present invention relates broadly to crime scene evidence markers, and more particularly to a crime scene evidence marker with improved stability and rigidity over prior markers. Referring to FIGS. 1 and 2, a first embodiment of the crime scene evidence marker 2 according to the invention will be described. The marker 2 includes a base 4 and a post 6. The base includes coplanar legs 8 and a projection 10 with four side walls 11. The post 6 is removably attached to the projection 10. The lower end opening (not shown) of the post 6 includes a configuration that is matable with the configuration of the projection 10. The legs 4 are of a minimal thickness, approximately $\frac{1}{16}$th of an inch, so that measuring from the ground up is more precise.

Figure 3:
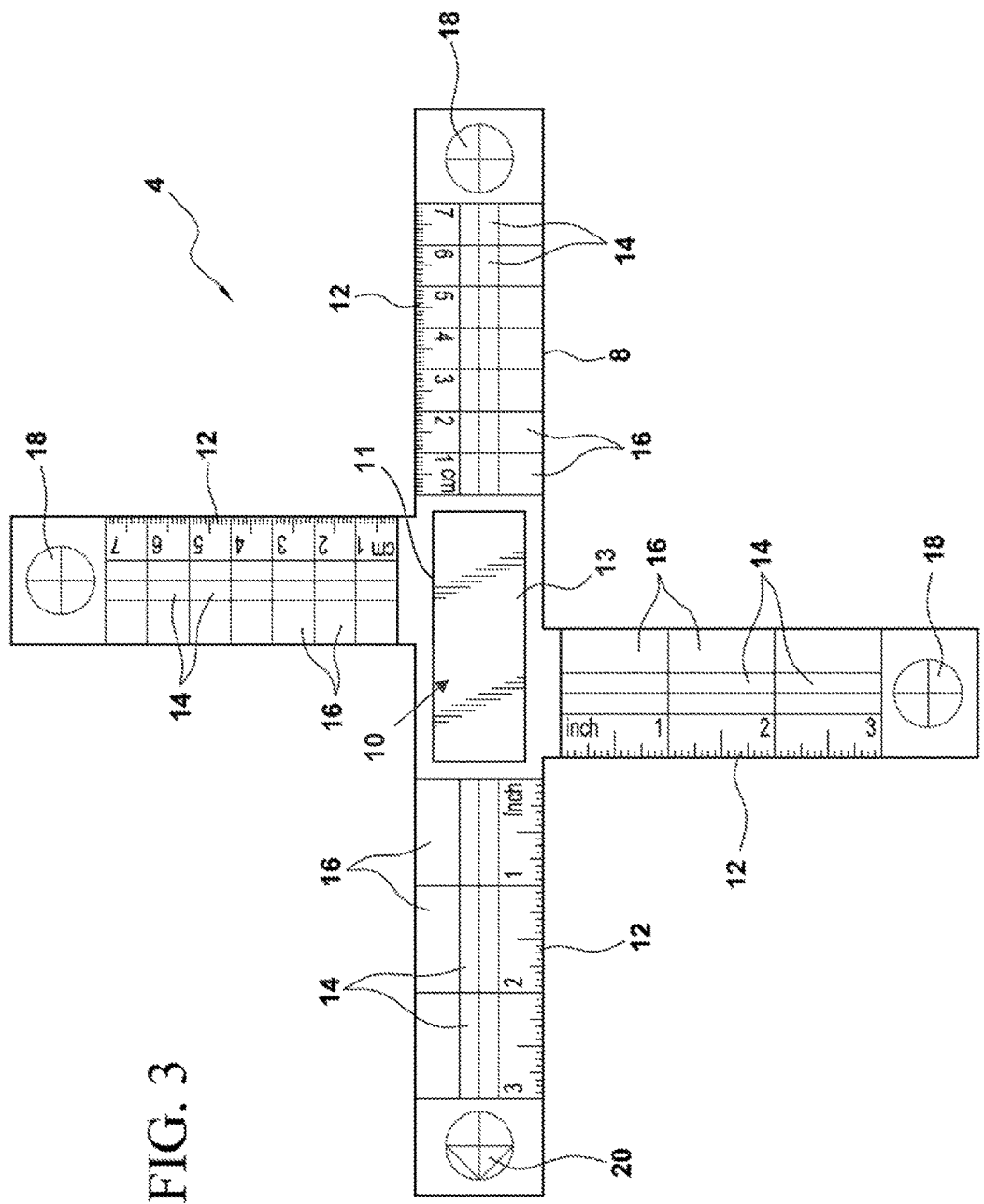
FIGS. 3 and 4 are top views, respectively, of alternative embodiments of the crime scene evidence marker.

Referring now to FIG. 3, the coplanar legs 8 and projection 10 of the base 4 will be described. In a preferred embodiment, there are four coplanar legs 8, each of which is arranged at ninety degrees relative to an adjacent leg. The four coplanar legs 8 which extend from the center of the base 4 are equidistantly spaced, and create an "X" or cross shape. The legs meet at a central portion of the base 4, where the projection 10 is located. The projection is of a rectangular configuration with four side walls 11 and a top wall 13. The four coplanar legs 8 each have measuring indicia 12 placed thereon. The measuring indicia is scaled in centimeters and in inches. Each leg has scaling indicia 14 which preferably is similar to the alternating black and white scales of the ABFO No. 2 photomacrographic scale designed by the American Board of Forensic Odontology and known in the art. Additional scaling indicia 16 is provided and preferably includes a gray scale, used to assist in color correction of images captured at a crime scene. A preferred gray scale is 18%, but other scales are suitable. Located at a remote end of the legs 8 are crosshair circles 18, which are used to help compensate for distortion in photographic images. At the remote end of one leg is an arrow 20 which can be used to denote directional relevance at a crime scene.

Figure 4:
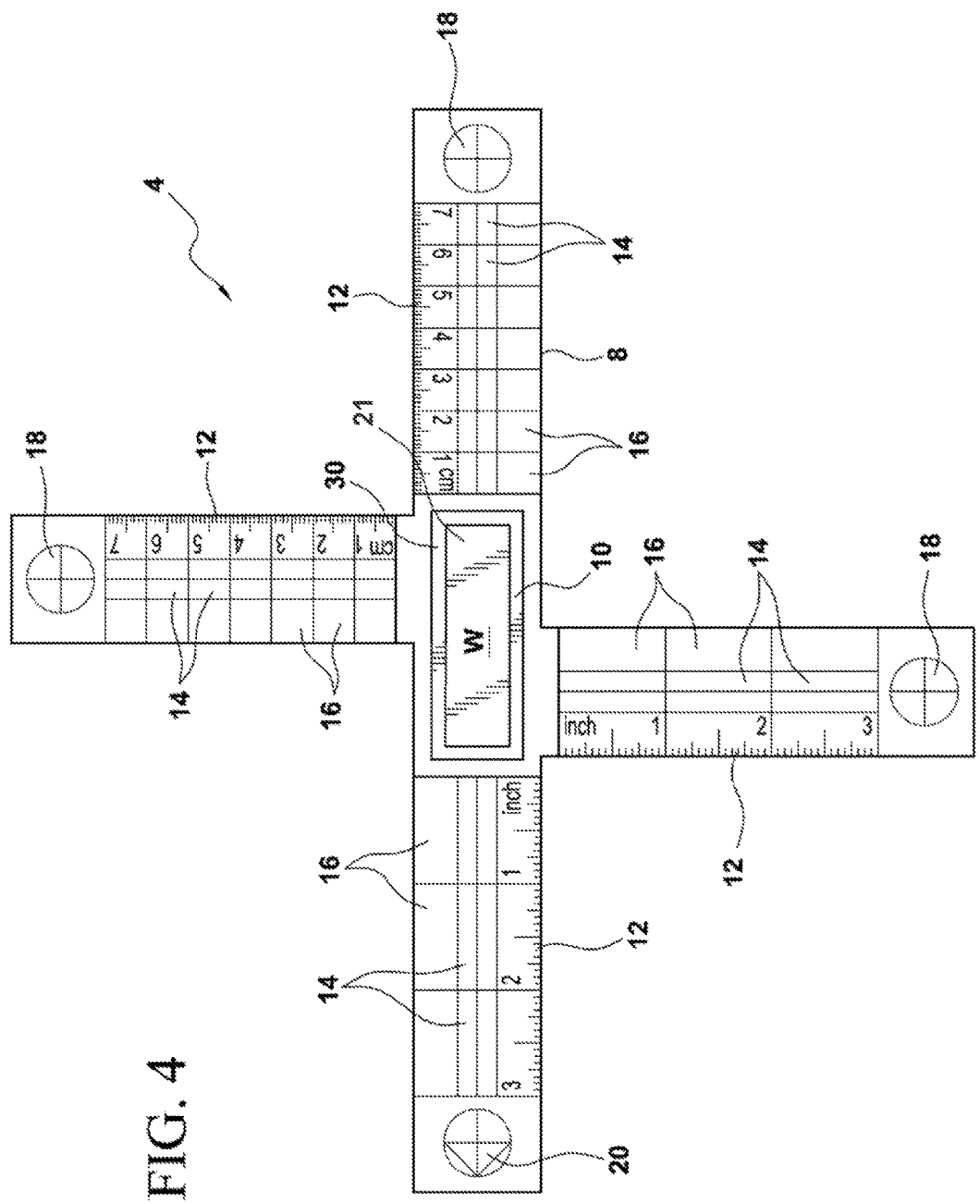

FIG. 4 shows a separate embodiment of the base. Unlike in the previous embodiments, the base projection 10 does not include a top wall, but rather, includes only the four side walls 11 which define a cavity and upper opening 21 in which a weight W can be placed. The weight is used to add stability to the crime scene evidence marker 2.

Referring again to FIG. 2, the post 6 will be further described. The post has measuring indicia 12 placed thereon. The measuring indicia is substantially similar to the measuring indicia of the coplanar legs, including a centimeters and inches scale, an alternating black and white scale 14, and a gray scale 16. The post 6 further includes crosshair circles 18 which are placed at a remote distance from the lower end of the post. Beyond the crosshairs, at a more remote location, is a numeric indicator 22 that can be used to distinguish one crime scene evidence marker from another. The indicator 22 can include any other type of symbol such as a letter or letters. The background 24 on which the indicator 22 is placed is preferably a color that is easily viewable from a distance (e.g. yellow or fluorescent orange).

Referring now to FIG. 1, an embodiment of the crime scene evidence marker as assembled when used at the scene of a crime is shown. The post 6 is mated with the projection (not shown), fully covering the projection. The lower end of the post 6 is flush against the base 4 so that the measuring indicia 12 of the legs 8 and post 6 meet at a zero point 26 for improved measuring. The top of the post 6 includes a crosshair circle 18, a numeric indicator 22, and an opening 28. The opening 28 accommodates a flag or similar object placed therein which can be used to assist in viewing the crime scene evidence marker 2 from afar.

While the preferred forms and embodiments of the invention have been illustrated and described, it will be apparent to those of ordinary skill in the art that various changes and modifications may be made without deviating from the inventive concepts set forth above.

What is claimed is:

1. A three-dimensional crime scene evidence marking device comprising:
    (a) A base including a central portion and a plurality of coplanar legs extending in spaced relation from said central portion in first and second dimensions, said coplanar legs having an outer surface containing measuring indicia;
    (b) a projection connected with said base central portion; and
    (c) a post removably connected with said projection and having an outer surface containing measuring indicia, said post containing an opening in a lower end thereof and having a configuration complementing said projection, said post lower end receiving said projection in a mating configuration to connect said post with said base and extend from said base in a third dimension perpendicular to a plane containing said legs.

2. A marking device as defined in claim 1, wherein said projection comprises four walls.

3. A marking device as defined in claim 2, wherein said projection and said post each have a rectangular cross-sectional configuration.

4. A marking device as defined in claim 3, wherein said projection walls define a cavity having an open upper end.

5. A marking device as defined in claim 4, and further comprising a weight arranged in said projection cavity.

6. A marking device as defined in claim 5, wherein said plurality of legs comprises four legs each of which is arranged at ninety degrees relative to an adjacent leg.

7. A marking device as defined in claim 1, wherein said legs are equidistantly spaced.

\* \* \* \* \*